US006368713B1

(12) United States Patent
Motojima

(10) Patent No.: US 6,368,713 B1
(45) Date of Patent: Apr. 9, 2002

(54) HOLLOW MICROFIBERS AND PROCESS FOR PRODUCING THE SAME

(75) Inventor: Seiji Motojima, Gifu (JP)

(73) Assignee: Japan Science and Technology Corporation, Sanama (JP)

( * ) Notice: Subject to any disclaimer, the term of this patent is extended or adjusted under 35 U.S.C. 154(b) by 0 days.

(21) Appl. No.: 09/271,708

(22) Filed: Mar. 18, 1999

Related U.S. Application Data

(63) Continuation of application No. PCT/JP98/03251, filed on Jul. 21, 1998.

(30) Foreign Application Priority Data

Jul. 18, 1997 (JP) .............................................. 9-208341

(51) Int. Cl.$^7$ ............................ D02G 3/00; B05D 3/02
(52) U.S. Cl. ....................... 428/398; 428/367; 428/359; 428/362; 428/369; 428/371; 428/397; 447/447.1; 447/447.2; 447/447.3; 447/447.6; 427/228; 427/377; 501/95.1
(58) Field of Search ................................. 428/367, 359, 428/362, 369, 371, 397, 398; 447/447.1, 447.2, 447.3, 447.6, 447.7; 501/95.1; 427/228, 377

(56) References Cited

U.S. PATENT DOCUMENTS

| 4,663,230 A | * | 5/1987 | Tennent ....................... 428/367 |
| H721 H | * | 1/1990 | McQuillan ................... 264/56 |
| 5,011,566 A | | 4/1991 | Hoffman |
| 5,102,647 A | | 4/1992 | Yamada et al. |
| 5,165,909 A | * | 11/1992 | Tennent et al. .......... 423/447.3 |
| 5,171,560 A | * | 12/1992 | Tennent ................... 423/447.3 |
| 5,298,298 A | | 3/1994 | Hoffman |
| 5,456,897 A | * | 10/1995 | Moy et al. ............... 423/447.3 |
| 5,500,200 A | * | 3/1996 | Mandeville et al. ..... 423/447.3 |
| 5,552,352 A | * | 9/1996 | Brun et al. .................... 501/88 |
| 5,578,543 A | * | 11/1996 | Tennent et al. ............. 502/180 |
| 5,589,152 A | * | 12/1996 | Tennent et al. .......... 423/447.3 |
| 5,611,964 A | * | 3/1997 | Friend et al. ................ 252/511 |
| 5,626,650 A | * | 5/1997 | Rodriguez et al. ............ 95/116 |
| 5,643,670 A | * | 7/1997 | Chung ........................ 428/367 |
| 5,650,370 A | * | 7/1997 | Tennent et al. ............. 502/174 |
| 5,653,951 A | * | 8/1997 | Rodriguez et al. .......... 423/439 |
| 5,707,916 A | * | 1/1998 | Snyder et al. ............. 502/180 |
| 5,726,116 A | * | 3/1998 | Moy et al. .................. 502/182 |
| 5,853,877 A | * | 12/1998 | Shibuta ...................... 478/357 |
| 5,877,110 A | * | 3/1999 | Snyder et al. ............. 502/180 |
| 5,908,585 A | * | 6/1999 | Shibuta ....................... 252/506 |

FOREIGN PATENT DOCUMENTS

| JP | 59-179875 | | 10/1984 |
| JP | 4-222228 | | 8/1992 |
| JP | 6-2269 | | 1/1994 |
| JP | 9-31757 | | 2/1997 |
| JP | 411043827 A | * | 2/1999 |
| WO | WO 95/07380 | | 3/1995 |
| WO | WO97/15934 | * | 5/1997 |
| WO | WO97/15935 | * | 5/1997 |
| WO | WO97/45257 | * | 12/1997 |
| WO | WO99/04073 | * | 1/1999 |

* cited by examiner

Primary Examiner—Cynthia H. Kelly
Assistant Examiner—J. M. Gray
(74) Attorney, Agent, or Firm—Peter F. Corless; Christine C. O'Day; Edwards & Angell, LLP

(57) ABSTRACT

Hollow carbon microcoils are provided having a pitch that is substantially zero. Also provided are ceramic microcoils comprising a metal nitride, a metal carbide or a metal carbonitride. The invention also includes methods for producing such microcoils.

13 Claims, 1 Drawing Sheet

HOLLOW MICROFIBERS AND PROCESS FOR PRODUCING THE SAME

The present application is a continuation of International application PCT/JP98/03251, having and international filing date of Jul. 21, 1998, and which is incorporated herein by reference.

TECHNICAL FIELD

The present invention relates to a process for producing hollow microcoils, or hollow microfibers that can be used as a material for producing a three-dimensional reinforcing composite material, electromagnetic wave absorbing material, electrode material, catalyst, catalyst carrier, adsorbing agent, micromechanical element, microswitching element, microsensor, microfilter and the like.

BACKGROUND ART

Fibers and whiskers (slender single crystals like whiskers of a cat) of carbon fibers, metal carbides or nitrides have heretofore been produced relying upon the metallic catalytically activated CVD method, the fibers and whiskers assuming the state of straight fibers which are completely solid no to the cores of the fibers. Hollow fibers in the form of micropipes have not at all been reported. Generally, the fibers and whiskers grow in vapor phase relying upon the VLS (gas-liquid-solid) mechanism With this mechanism, however, the fibers or whiskers are not theoretically allowed to grow into the form of pipes. As for producing the fibers in the form of microcoils, the present inventors have previously proposed a process for producing microcoiled carbon fibers by pyrolyzing acetylene in the presence of a metal catalyst and a trace amount of sulfur or phosphorus impurities (see Japanese Unexamined Patent Publication (Kokai) No. 222228/1992). The inventors have also proposed a process for producing a variety of microcoiled meal nitride fibers by subjecting the coiled carbon fibers to the vapor-phase metallization and to the nitrogenation simultaneously at a high temperature (still pending).

The microcoiled carbon fibers can be produced maintaining good reproducibility and at a high yield by pyrolyzing a hydrocarbon gas in the presence of a metal catalyst and a trace amount of sulfur or phosphorous impurities. The shape of the coils is generally irregular. Even the regularly wound coils are not intimately adhered to each other but include gaps. The Inventors therefore have closely studied the conditions for synthesizing the coiled carbon fibers and the after-treatment therefor, and discovered the fact that when the synthesizing conditions are highly strictly controlled, the carbon fibers are wound very regularly, completely filling up the gaps among the coils, making it possible to obtain hollow microcarbon fibers with hollow coil cores. The inventors have further studied a process for producing various hollow ceramic microfibers using the above-mentioned hollow microcarbon fibers as a starting material and have completed the present invention. It is also allowable to use hollow metal carbide microfibers, metal nitride microfibers and metal carbonitride fibers as a starting material. The object of the present invention is to provide a novel process for producing hollow microfibers of various intermetallic compounds and ceramic compounds.

DISCLOSURE OF THE INVENTION

The present invention relates to hollow carbon microcoils of which the fiber cores are hollow and the coils are intimately adhered to each other, to hollow ceramic microcoils or hollow ceramic microfibers obtained by subjecting the hollow carbon microcoils to the vapor-phase metallization silification, boration, carbonization, nitrogenation and/or oxidation in a mixed gas containing a metal-, silicon-, boron-, carbon-, nitrogen- or oxygen-containing gas at a high temperature, and to a process for producing the same. The invention further relates to hollow ceramic microcoils or hollow ceramic microfibers obtained by subjecting the hollow metal carbide microcoils or the metal nitride microcoils formed by metallizing the hollow carbon microcoils to the vapor-phase metallization, silicification, boration, carbonization, nitrogenation and/or oxidation in a mixed gas containing a metal-, silicon-, boron-, carbon-, nitrogen- or oxygen-containing gas at a high temperature, and to a process for producing the same.

More specifically, the invention provides hollow carbon microcoils which are completely and intimately adhered to each other as a result of highly strictly controlling the conditions of synthesis at the time of synthesizing the carbon microcoils, and provides hollow ceramic microcoils which are obtained by subjecting the hollow carbon microcoils as a starting material to the vapor-phase diffusion reaction in a mixed gas containing a metal-, silicon-, boron-, carbon-, nitrogen- and/or oxygen-containing gases at a high temperature, the hollow ceramic microcoils being composed of an intermetallic compound, a metal silicate, a metal boride, a metal carbide, a metal nitride, a metal oxide or a composite compound thereof in which part or whole of carbon atoms are physically or chemically treated with the above-mentioned components.

The invention further provides hollow ceramic microfibers in which the neighboring coil-forming portions of the microcoils are partly or wholly melt-adhered together, so that the microcoils partly or wholly assume the fibrous form as a result of the above-mentioned vapor-phase diffusion reaction at a high temperature.

The invention further provides hollow ceramic microcoils or hollow ceramic microfibers which are obtained by subjecting the known hollow carbon microcoils, hollow carbon fibers or hollow carbon microfibers of which the coils are not intimately adhered to each other as a starting material to the vapor-phase treatment in one stage or in two or more stages in a mixed gas containing a metal-, silicon-, boron-, carbon-, nitrogen- and/or oxygen-containing gas at a high temperature, the hollow ceramic microcoils or the hollow ceramic microfibers being composed of an intermetallic compound, a metal silicate, a metal carbide, a metal nitride, a metal oxide or a composite compound thereof in which part or whole of carbon atoms are physically or chemically treated with the above-mentioned components, and a process for producing the same.

BEST MODE FOR CARRYING OUT THE INVENTION

Figure 1:
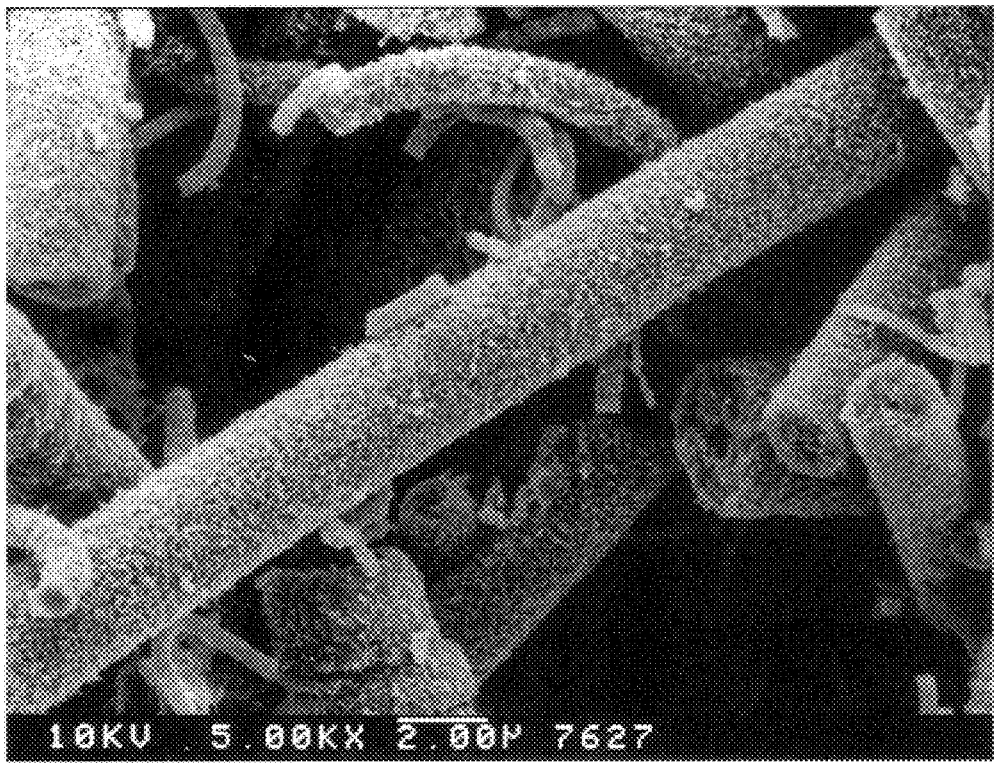
FIG. 1 is a microphotograph in lieu of a drawing and illustrates the surfaces of hollow titanium nitride microfibers obtained in Example 4.

Among the starting gases that can be used in the present invention, almost any transition metal, typical metal, semi-metal, a monomer thereof and a compound thereof can be used as metal components, such as single metal, halide, hydrogenide and organometal compound that produce a high vapor pressure at high temperatures. As a carbon source, there can be chiefly used carbon of a carbon fiber. It is, however, also allowable to supply from an external source a hydrocarbon gas such is methane or ethane, or a carbon-containing gas such as carbon tetrachloride. As a nitrogen source, there can be used molecules or compounds containing large amounts of nitrogen atoms, such as nitrogen, ammonia or hydrazine. As boron atoms, there can be used a compound gas containing boron atoms, such as boron trichloride, diborane or borazine. As silicon there can be used a silicon-containing gas such as silane, disilane, silicon tetrachloride or disilicon hexachloride.

It is not particularly necessary to make hydrogen present in the reaction system, but the presence of hydrogen is desirable. An inert gas such as He or Ar may be present in the reaction system. No catalyst is particularly required for the reaction. As required, however, a catalyst may be made present.

In producing hollow ceramic microcoils or hollow ceramic microfibers of the present invention, it is allowable to use, as a starting material, hollow carbon microfibers or hollow carbon microcoils that are synthesized in vapor phase, hollow graphite fibers, metal carbide fibers or metal nitride fibers obtained by heat-treating the above-mentioned hollow carbon microfibers or hollow carbon microcoils, or hollow fibers that are molded and hear-treated by regularly and densely winding an organic precursor such is polyacrylonitrile or pitch.

In producing the hollow ceramic microcoils or hollow ceramic microfibers of the present invention, the react ion temperature is from 700 to 1800° C. and, preferably, from 900 to 1200° C. The flow rate of the metal-containing gas for metallization is from 1 to 50 cc/min, and, preferably, from 5 to 10 cc/min. The flow rate of the nitrogen gas or ammonia gas for nitrogenation is from 10 to 500 cc/min. and, preferably, from 50 to 200 cc/min. The flow rate of the silicon-containing gas for silicification is from 1 to 50 cc/sec. and, preferably, from 5 to 20 cc/sec. The flow rate of the boron-containing gas for boration is from 1 to 50 cc/sec. and, preferably, from 5 to 20 cc/sec. When the reaction is carried out in the presence of a hydrogen gas, the flow rate of the hydrogen gas is from 250 to 650 cc/min. and, preferably, from 350 to 450 cc/min. When ammonia is used, the hydrogen gas may not be introduced. It is also allowable to add an inert gas such as argon or helium to the starting gases.

The hollow microcoils or hollow microfibers obtained by the present invention have a fiber diameter of from 0.5 to 15 $\mu$m, a hollow core diameter of from 0.01 to 5 $\mu$m, and a pipe length of from 0.01 mm to 300 mm, to which only, however, the invention is in to way limited. By changing the reaction temperature, reaction time or the starting gas composition, it is allowed to obtain hollow ceramic microcoils or hollow ceramic microfibers in which carbon atoms are partly remaining.

It is not yet obvious in what state the elements are present in the hollow ceramic microcoils or hollow ceramic microfibers of the present invention. In the coils or fibers composed of a multi-alloy, however, various structures are considered in which the alloy components are in a state of perfect solid solution acquiring a homogeneous phase, some components or alloy components are segregated, or all components or alloy components are completely dispersed independently of each other. The same holds even for other compounds.

The hollow microcoils or hollow microfibers of the present invention can be applied to various applications where the existing linear carbon fibers, carbide fibers, nitride fibers and boride fibers are used. Owing to their properties brought about from a micropiped shape which is a particular shape, the hollow microcoils or hollow microfibers of the invention are useful as various functional materials such as three-dimensional reinforcing fibers for FRP and FRM, electromagnetic wave-absorbing material. electrode material, micromechanical element, microswitching element, microsensor, microfilter, temperature-resistant and corrosion-resistant packing, adsorbing agent, catalyst material, catalyst carrier and the like.

EXAMPLES

Concrete examples of the present invention will now be described to which only, however, The invention is in no way limited.

Example 1

A graphite substrate to which a nickel powder (having an average particle diameter of 5 $\mu$m) has been applied was set to a central portion of a thermal CVD apparatus made of a vertical transparent quartz tube having an inner diameter of 60 mm and a length of 1000 mm, and the reaction was carried out at 750° C. As the reaction gases, there were supplied acetylene containing 1.51 mol % of thiophene impurities at a rate of 80 cc/min., hydrogen at a rate of 400 cc/min. and nitrogen at a rate of 200 cc/min. from the upper side, and the reaction was carried out under normal pressure. The position of the substrate was lowered accompanying the growth of the microcoils so that the distance between the starting gas introduction port and the end of the grown microcoils was from 1 to 10 mm and, preferably, from 2 to 3 mm. Most of the coils grew to pairs being entangled by each other, i. e., double coils grew being very regularly and densely wound without any gap between the coils. The coils possessed an outer diameter of from 0.1 to 15 $\mu$m, no pitch and a length of from 0.01 to 200 mm depending upon the reaction time. Thus, there were obtained hollow carbon microcoils having hollow fiber cores.

Example 2

The reaction was carried out under the same conditions as in Example 1 but using titanium and tungsten powders (average particle diameter of 5 $\mu$m) as catalysts. There were obtained double coils that were wound very densely with no gap between the coils and having lengths of from 0.01 to 200 mm depending upon the reaction time.

Example 3

A Quartz boat containing 100 mg of the hollow carbon microcoils obtained in Example 1 was set to a central portion of a rotary thermal CVD apparatus made of a horizontal rotary opaque quartz reaction tube having an inner diameter of 23 mm and a length of 500 mm, and was heated up to mid 1200° C. in an argon gas. Thereafter, a titanium tetrachloride gas was supplied at a rate of 10 cc/min. and a hydrogen gas at a rate of 100 cc/min. to carry out the reaction for 2 hours. The reaction tube was rotated at a speed of from 1 to 300 rpm and, preferably, from 10 to 60 rpm. After the reaction, the weight of the sample increased to 500 mg. Upon titanizing in vapor phase, the carbon microcoils were gradually transformed into TiC concentrically from the outer side toward the core thereof. Though the coils were completely adhered together, the hollow state along the fiber cores was completely maintained. When completely titanized and was transformed into TiC1.0 used to the core, the weight increased by about 5 times as great. According to this Example, therefore, there were obtained hollow TiC microfibers that were a hundred percent transformed into TiC up to the cores of the fibers.

Example 4

Figure 2:
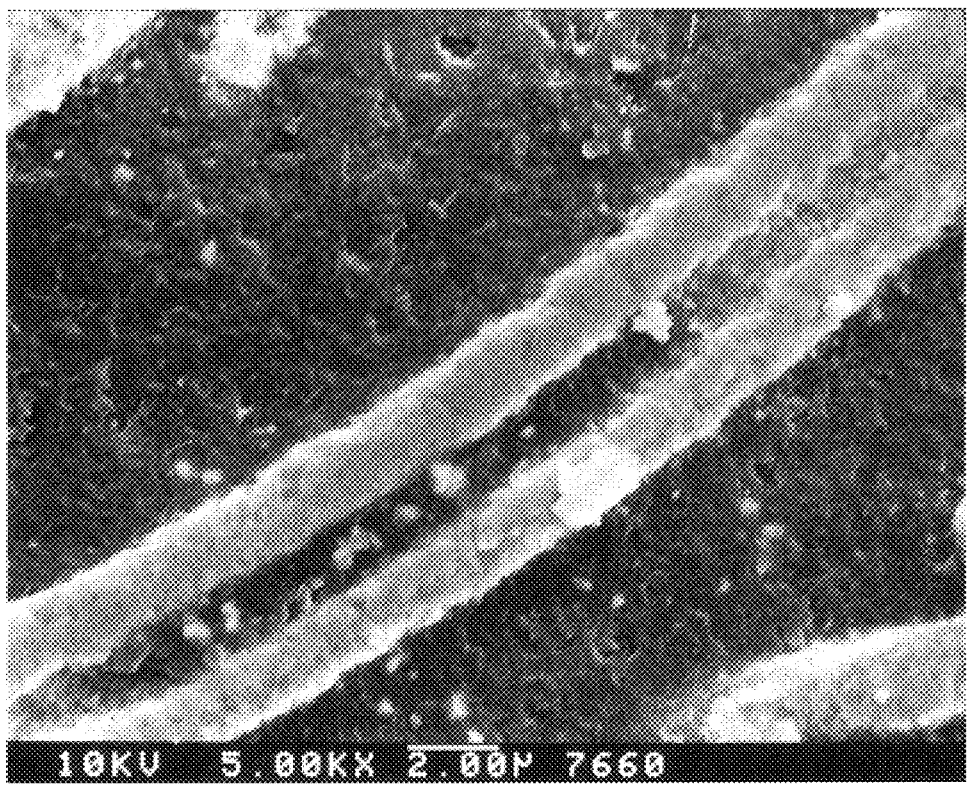
FIG. 2 is a microphotograph in lieu of a drawing and illustrates mirror-surface polished cross section of the hollow titanium nitride microfibers obtained in Example 4.

A quartz boat containing 100 mg of the hollow carbon microcoils obtained in Example 1 was set to a central portion of a rotary thermal CVD apparatus made of a horizontal rotary opaque quartz tube having in inner diameter of 23 mm and a length of 500 mm; and was heated up to mid 1200° C. in an argon gas. Thereafter, a titanium tetrachloride gas was supplied at a rate of 10 cc/min. and a nitrogen gas at a rate of 100 cc/min. to carry out the reaction for 1 hour. After the reaction, the color of the sample changed from the black gray of the starting carbon microcoils into a dark yellow brown, and its weight increased to 310 mg. From the X-ray diffraction diagram were observed a broad peak representing in amorphous phase of the starting carbon microcoils and a sharp peak representing the presence of a titanium nitride (TiN) phase. However, no peak representing the presence of titanium carbide was observed. That is, in this Example, the carbon microcoils were titanized in vapor phase and were nitrogenated, simultaneously, and were transformed into TiN. The weight of the carbon microcoils increased to about 5.2 times is great when they were completely transformed into TiN1.0. In the case of this Example, therefore, the transformation ratio into TiN as calculated from an increase in the weight was about 50 mol %. FIGS. 1 and 2 illustrate the surface of the sample after the reaction and the mirror-surface polished cross section thereof. Fine polycrystalline TiN particles were precipitating on the surfaces of the sample, and the grooves of the coils were almost filled and were completely adhered. From the cross section, furthermore, continuous white and bright portions were observed on the surfaces of the coils and an the inside thereof, and the presence of titanium and nitrogen was recognized these portions. The presence of carbon only was recognized on the dark central portions. The ratio of the areas at the outer doughnut-like TiN portions to the central carbon potions was about 50%. That is, about 50% of the sectional areas from the surfaces of the fibers were transformed into TiN, and the core portions remained carbonaceous. Almost the same results were obtained even when an ammonia gas or a hydrazine gas was used instead of the nitrogen gas.

Example 5

The react ion was carried out under the same conditions as in Example 4 but selecting the reaction time to be 3 hours. After the reaction, the color of the sample changed into a brownish gold color. From the observation of cross section and X-ray diffraction, the presence of carbon of the unreacted hollow carbon microcoils was not at all observed, and the starting carbon microcoils had been completely transformed into a TiN film. The hollow state of the starting material was completely maintained to form micropipes. That is, despite the hollow carbon microcoils were completely turned into TiN, the hollow state was completely maintained, and the hollow TiN microfibers were obtained.

Example 6

The reaction was carried out under the same conditions as in Example 4 but using zirconium tetrachloride instead of titanium tetrachloride and selecting the reaction time to be 3 hours. After the reaction, the color of the sample changed into a somewhat grayish gold color and the weight increased to 8.8 times as great. The X-ray diffraction diagram indicated no peak that represents the amorphous phase or the ZrC phase of the starting carbon fibers but indicated only a sharp peak representing the presence of the ZrN phase. It this Example, therefore, it was learned that the hollow state was completely maintained despite the hollow carbon microcoils were completely transformed into ZrN, and the hollow ZrN microfibers were obtained.

Example 7

The reaction was carried out under the same conditions as in Example 4 but using niobium pentachloride instead of titanium tetrachloride and selecting the reaction time to be 5 hours. The X-ray diffraction diagram of the sample after the reaction indicated no peak that represents the amorphous phase or the NbC phase of the starting carbon fibers but indicated only a sharp peak representing the presence of the NbN phase.

Example 8

A quartz boat containing 100 mg of the hallow TiC microfibers obtained in Example 3 was set to a central portion of a rotary thermal CVD apparatus made of a horizontal rotary opaque quartz reaction tube having an inner diameter of 23 mm and a length of 500 mm and was heated up to mid 1200° C. in an argon gas. Thereafter, an ammonia gas was supplied at a rate of 100 cc/min. to carry out the reaction for 2 hours. The rotational speed during the reaction was from 1 to 300 rpm and, preferably, from 10 to 60 rpm. After the reaction, the color of the sample changed into a golden brown but the weight did not almost increase. Even in theory, the weight does not almost increase despite the titanium carbide is transformed into the titania nitride. The X-ray diffraction diagram, however, indicated only a peak due to the titanium nitride phase but did not at all indicate a peak due to the titanium carbide phase. The hollow shape of the hollow TiC microfibers did not almost change even after the nitrogenation treatment. The mirror-surface polished cross section indicated the presence of a continuous and thick TIN film only, but the presence of carbon at the center thereof was not at all confirmed.

Example 9

The reaction was carried out under the same conditions as in Example 4 but adding extra methane at a rate of 5 cc/min. to the starting gases. After the reaction, the color of the sample changed into a dark blue, and the weight increased to 310 mg. The X-ray diffraction diagram indicated a peak due to the titanium carbonitride in addition to the peak due to the titanium nitride.

Example 10

The reaction was carried out under the same conditions as in Example 4 but adding extra water vapor at a rate of 5 cc/min. to the starting gases. After the reaction, the color of the sample did not change, but the weight increased to 310 mg. The X-ray diffraction diagram indicated a peak due to the titanium carbonitride in addition to the peak due to the titanium nitride.

Example 11

The reaction was carried out under the same conditions as in Example 3 but supplying titanium tetrachloride at a rate of 30 cc/min., boron trichloride at a rate of 30 cc/min., hydrogen at a rate of 500 cc/min., and argon at a rate of 100 cc/min. as starting gases. After the reaction, the X-ray diffraction diagram of the sample indicated a peak due to amorphous carbon of the starting hollow microcarbon fibers and a peak due to titanium biboride (TiB2). The hollow shape of the starting hollow carbon microcoils was completely maintained on the mirror surface polished cross section, and there were obtained hollow, titania biboride microfibers in which the carbon microcoils partly retained unreacted.

Example 12

The reaction was carried out under the same conditions as in Example 11 but selecting the reaction time to be 12 hours. After the reaction, the X-ray diffraction diagram of the sample indicated only a peak due to the titanium biboride, but from which the presence of uncreated carbon was not at all observed. A continuous titanium biboride film only was observed on the mirror surface polished cross section, and the hollow shape of the starting ho low carbon microcoils was completely maintained therein. That is, the starting hollow carbon microcoils were completely transformed into the titanium biboride, and there were obtained hollow titanium biboride microfibers.

Example 13

Hollow carbon microcoils obtained in Example 1 were introduced into a central portion of a rotary thermal CVD apparatus made of a rotary opaque quartz reaction tube having used inner diameter of 23 mm and a length of 500 mm, and was heated up to mid 1200° C. in an argon gas. Thereafter, iron trichloride was supplied at a rate of 30 cc/min., hydrogen at a rate of 300 cc/min., argon at a rate of 100 cc/min., as starting gases, to carry out the reaction for 3 hours. The rotational speed of the reaction tube was from 1 to 300 rpm and, preferably, from 10 to 60 rpm. After the reaction, the presence of unreacted carbon and the presence of iron carbide (Fe3C) were confirmed from the X-ray diffraction. Growth of fine crystalline particles were observed on the surfaces of the reaction product, and gaps between the coils had been completely filled up. Two layers including a layer of unreacted carbon and a layer of iron and from carbide were observed on the polished cross section. The hollow shape of the starting hollow carbon microcoils had been completely maintained even after the reaction.

Example 14

The reaction was carried out under the same conditions as in Example 13 but supplying iron carbonyl at a rate of 3 cc/min. and nickel carbonyl at a rate of 15 cc/min. as starting gases. After the reaction, it was confirmed that the sample contained unreacted carbon, iron, iron carbide and Fe—Ni alloy (Ni: 70 atomic %). The hollow shape of the starting hollow carbon microcoils had been completely maintained even after the reaction.

Example 15

The reaction was carried out under the same conditions as in Example 14 but selecting the reaction time to be 12 hours. No unreacted carton was observed in the reaction product, and a single layer of an Fe-Ni alloy only was observed an the mirror surface polished cross section.

Example 16

The hollow carbon microcoils obtained in Example 1 were measured for their tensile strength to be as large as from 100 to 350 kg/mm2 (250 kg/mm2 in average).

Example 17

The hollow titanium nitride microfibers obtained in Example 5 were measured for their tensile strength to be from 50 to 100 kg/mm2 (70 kg/mm2 in average).

Example 18

The hollow carbon microcoils obtained in Example 1 were measured for their electric resistance, and a metallic property of $3\times10^{-3}$ $\Omega$-cm was exhibited. The hollow titanium carbide microfibers obtained in Example 3 exhibited an electric resistance of $1\times10^{-4}$ $\Omega$-cm, which was a perfect metallic property. The same metallic properties were exhibited in the cases of other metal carbides, nitrides and intermetallic compounds.

Industrial Applicability

As described above, hollow micropiped carbon coils which are very densely and regularly wound are obtained by strictly controlling the reaction conditions at the time of synthesizing the microcoiled carbon by the catalytically activated pyrolysis of acetylene. Upon reacting the hollow micropiped carbon coils in the starting gases containing various metal components, silicon, boron, carbon, nitrogen of oxygen it 800 to 1800° C., furthermore there are quantitatively obtained micropiped ceramic fibers that are completely reacted up to a portion from, the surfaces or up to the cores. At this time, no catalyst is particularly required.

What is claimed is:

1. A hollow carbon microcoil having a pitch that is substantially zero.

2. A hollow ceramic microcoil comprising a metal nitride, a metal carbide or a metal carbonitride.

3. The microcoil of claim 2 wherein the microcoil has a pitch that is substantially zero.

4. A hollow ceramic microcoil of claim 2, wherein the microcoil has been subjected to vapor-phase metallization, silicification, boration or oxidation.

5. A hollow ceramic microcoil of claim 2 or 4 wherein neighboring coil-forming portions of the microcoil are at least partially melt-adhered together.

6. A process for synthesis of a carbon microcoil in a vapor phase, comprising compressing carbon microcoils during growth thereof whereby the carbon microcoils are densely and regularly wound and are intimately adhered together and hollow cores of the carbon microcoils are provided.

7. A process for producing hollow ceramic microcoils, comprising subjecting hollow carbon microcoils or hollow carbon fibers to vapor-phase metallization and carbonization in a gas comprising metal atoms at a temperature of from about 700° C. to 1800° C. wherein the coils or fibers are metallized.

8. The process of claim 7 wherein the gas comprises nitrogen atoms.

9. The process of claim 8 wherein the hollow ceramic microcoils are subjected to vapor-phase metallization, silification, boration, carbonization and/or oxidation in a gas comprising a metal, silicon, boron, carbon or oxygen.

10. The process of claim 8 wherein neighboring coil-forming portions of the microcoils are at least partially melt-adhered together.

11. The process of claim 7 wherein the hollow ceramic microcoils are subjected to vapor-phase metallization, silification, boration, carbonization and/or oxidation in a gas comprising a metal, silicon, boron, carbon or oxygen.

12. The process of claim 11 wherein neighboring coil-forming portions of the microcoils are at least partially melt-adhered together.

13. The process of claim 7 wherein neighboring coil-forming portions of the microcoils are at least partially melt-adhered together.

* * * * *